(12) United States Patent
Mariappan et al.

(10) Patent No.: US 10,841,226 B2
(45) Date of Patent: Nov. 17, 2020

(54) CONFIGURING SERVICE LOAD BALANCERS WITH SPECIFIED BACKEND VIRTUAL NETWORKS

(71) Applicant: Juniper Networks, Inc., Sunnyvale, CA (US)

(72) Inventors: Yuvaraja Mariappan, San Jose, CA (US); Sachchidanand Vaidya, Santa Clara, CA (US); Pragash Vijayaragavan, Sunnyvale, CA (US); Prasanna D. Mucharikar, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 16 days.

(21) Appl. No.: 16/369,169

(22) Filed: Mar. 29, 2019

(65) Prior Publication Data
US 2020/0314015 A1 Oct. 1, 2020

(51) Int. Cl.
H04L 12/803 (2013.01)
H04L 29/12 (2006.01)
G06F 9/50 (2006.01)
G06F 9/455 (2018.01)

(52) U.S. Cl.
CPC ........ *H04L 47/125* (2013.01); *G06F 9/45558* (2013.01); *G06F 9/5077* (2013.01); *H04L 61/2007* (2013.01); *G06F 2009/45595* (2013.01)

(58) Field of Classification Search
CPC . H04L 47/125; H04L 61/2007; G06F 9/5077; G06F 9/45558; G06F 2009/45595
See application file for complete search history.

(56) References Cited

U.S. PATENT DOCUMENTS

| 6,115,715 A | 9/2000 | Traversat et al. |
| 6,351,751 B1 | 2/2002 | Traversat et al. |
| 7,227,838 B1 | 6/2007 | O'Riordan |

(Continued)

FOREIGN PATENT DOCUMENTS

| WO | 2013184846 A1 | 12/2013 |
| WO | 2018/063332 A1 | 4/2018 |

OTHER PUBLICATIONS

"Kubernetes networking with OpenContrail," OpenContrail Blog, http://www.opencontrail.org/kubernetes-networking-with-opencontrail/, Jul. 26, 2015, 6 pp.

(Continued)

*Primary Examiner* — Curtis A Alia
(74) *Attorney, Agent, or Firm* — Shumaker & Sieffert, P.A.

(57) ABSTRACT

Techniques are described for specifying a backend virtual network for a service load balancer. An example orchestrator of this disclosure is configured to receive a service definition for a service implemented by load balancing service traffic for the service among a plurality of backend virtual execution elements, wherein the service definition specifies a first virtual network to use as a backend virtual network for the service, to instantiate, in a selected one of the computing devices, a backend virtual execution element for the service, and to configure, based on the service definition specifying the first virtual network to use as the backend virtual network for the service, a network controller for the virtualized computing infrastructure to configure a load balancer to load balance service traffic to a first virtual network interface, of the backend virtual element, for the first virtual network.

20 Claims, 13 Drawing Sheets

(56) References Cited

U.S. PATENT DOCUMENTS

| | | |
|---|---|---|
| 7,436,840 B1 | 10/2008 | Hoffman et al. |
| 7,460,526 B1 | 12/2008 | Hoffman et al. |
| 7,539,135 B1 | 5/2009 | Hoffman et al. |
| 9,276,816 B1 | 3/2016 | Conte et al. |
| 9,571,394 B1 | 2/2017 | Sivaramakrishnan et al. |
| 9,602,422 B2 | 3/2017 | Yip et al. |
| 9,712,436 B2 | 7/2017 | Tsirkin et al. |
| 9,722,877 B2 | 8/2017 | Uberoy et al. |
| 9,792,141 B1 | 10/2017 | Sethuramalingam et al. |
| 9,935,829 B1 | 4/2018 | Miller et al. |
| 10,121,009 B2 | 11/2018 | Kuhr et al. |
| 10,148,493 B1 | 12/2018 | Ennis, Jr. et al. |
| 10,250,677 B1 | 4/2019 | Aizikovich |
| 10,355,989 B1 | 7/2019 | Panchal et al. |
| 10,419,361 B2 | 9/2019 | Zhu et al. |
| 2004/0165581 A1 | 8/2004 | Oogushi |
| 2004/0210623 A1 | 10/2004 | Hydrie et al. |
| 2007/0288921 A1 | 12/2007 | King et al. |
| 2008/0151893 A1 | 6/2008 | Nordmark et al. |
| 2011/0051689 A1 | 3/2011 | Premec et al. |
| 2011/0067107 A1 | 3/2011 | Weeks et al. |
| 2012/0042054 A1 | 2/2012 | Kotha et al. |
| 2012/0170462 A1 | 7/2012 | Sinha |
| 2012/0170477 A1 | 7/2012 | Hieda |
| 2013/0263118 A1 | 10/2013 | Kannan et al. |
| 2014/0177518 A1 | 6/2014 | Akisada et al. |
| 2014/0254565 A1 | 9/2014 | Pitchaiah et al. |
| 2015/0067674 A1 | 3/2015 | Melander et al. |
| 2015/0222480 A1 | 8/2015 | Gan et al. |
| 2015/0281128 A1 | 10/2015 | Sindhu |
| 2015/0339216 A1 | 11/2015 | Wade |
| 2016/0094389 A1 | 3/2016 | Jain et al. |
| 2016/0359955 A1 | 12/2016 | Gill et al. |
| 2017/0034050 A1 | 2/2017 | Sunavala et al. |
| 2017/0244787 A1 | 8/2017 | Rangasamy et al. |
| 2017/0289065 A1 | 10/2017 | Zhu et al. |
| 2018/0062923 A1 | 3/2018 | Katrekar et al. |
| 2018/0063087 A1 | 3/2018 | Hira et al. |
| 2018/0063193 A1 | 3/2018 | Chandrashekhar et al. |
| 2018/0063201 A1 | 3/2018 | Zhang et al. |
| 2018/0239647 A1 | 8/2018 | Tsai et al. |
| 2018/0324280 A1 | 11/2018 | Solis et al. |
| 2018/0375728 A1 | 12/2018 | Gangil et al. |
| 2019/0087244 A1 | 3/2019 | Turner |
| 2019/0097838 A1 | 3/2019 | Sahoo et al. |
| 2019/0297011 A1 | 9/2019 | Nainar et al. |

OTHER PUBLICATIONS

Mackie et. al., "BGP-Signaled End-System IP/VPNs," draft-ietf-l3vpn-end-system-06, Network Working Group, Dec. 15, 2016, 32pp.

"PCI-SIG SR-IOV Primer: An Introduction to SR-IOV Technology," Rev. 2.5, Intel Corp., Jan. 2011, 28 pp.

Rosen, "BGP/MPLS IP Virtual Private Networks (VPNs)," Request for Comments 4364, Internet Engineering Task Force Network Working Group, Feb. 2006, 48 pp.

"Multiple Network Interfaces in Kubernetes," Application Note, Intel Corp., Software Defined Datacenter Solutions Group, Apr. 2018, 15pp.

U.S. Appl. No. 16/118,107, by Juniper Networks, Inc. (Inventor: Vinay Chandrakant Rao), filed Aug. 30, 2018.

"Kubernetes Network Custom Resource Definition De-facto Standard v1 Support," OpenStack Docs: Kubernetes Network Custom Resource Definition De-facto Standard v1 Support, https://docs.openstack.org/kuryr-kubernetes/latest/specs/rocky/npwg_spec_support.html, accessed Sep. 4, 2018, 6 pp.

"Configuration of a Virtual Router on a FireSIGHT System," Cisco, accessed from https://www.cisco.com/c/en/us/support/docs/security/firesight-management-center/118021-technote-firesight-00.pdf, Jul. 21, 2014, 4 pp.

Lowe, "Introducing Linux Network Namespaces," Scott's Weblog The weblog of an IT pro focusing on cloud computing, Kubernetes, Linux, containers, and networking, Sep. 4, 2013, 4 pp.

Siddiqui et al., "Enabling New Features with Kubernetes for NFV," Intel Corporation, Data Center Solution Networking Group, White Paper, Jun. 1, 2017, 14 pp.

Tao, "The Work of Containerized NFV Infrastructure on Arm Platform," Open Source Summit Japan & Automotive Linux Summit, Jun. 21, 2018, 34 pp.

Extended Search Report from counterpart European Application No. 19181700.6, dated Jan. 2, 2020, 7 pp.

CONFIGURING SERVICE LOAD BALANCERS WITH SPECIFIED BACKEND VIRTUAL NETWORKS

TECHNICAL FIELD

The disclosure relates to a virtualized computing infrastructure and, more specifically, to configuring load balancers for virtual execution elements (e.g., virtual machines or containers) deployed to virtualized computing infrastructure within a network.

BACKGROUND

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world, with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, such as Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for specifying a backend virtual network for a service load balancer. For example, based on the specified backend virtual network for a service, the network controller selects a virtual network interface from multiple available virtual network interfaces, usable by a logically-related group of one or more containers ("pod") that is a member of the service, and configures the selected virtual network interface as the exposed interface for the backend to the service. A container networking interface plugin (CNI) is a networking solution for application containers and is a runtime executable that configures a network interface into a container network namespace and configures the computing device ("host") hosting the container, which may be a member of a pod. The CNI further assigns the network address (e.g., IP address) to the network interface and may also add routes relevant for the interface, such as routes for the default gateway and one or more nameservers.

The IP address of a given pod is not deterministic. That is, the IP address ceases to exist once the corresponding pod is terminated, and the functionalities provided by the pod become unavailable from that point onward. To address this issue, orchestration systems such as Kubernetes, may use a service to abstract a logical set of pods. A service may be implemented as a layer 4 (L4) load balancer for instance and configured by a network controller for the virtualized computing infrastructure. Each pod abstracted by a service represents a so-called "backend" of each load balancer to which the pod is linked and processes requests issued to the service. Client modules can access the load balancer using the service IP address of the load balancer, regardless of any changes to the backends. In this way, the load balancer provides a pod-agnostic way to use the functionalities provided by the currently-active pods.

In some examples, a pod may be configured with virtual network interfaces for multiple networks. The load balancer is configured to identify the backends by using one of several available objects associated with the corresponding pod. Load balancers are configured to forward traffic to each backend using a virtual network interface of the corresponding pod. However, existing load balancers default to the virtual network interface corresponding to the default virtual network for sending traffic to a particular pod.

According to aspects of this disclosure, a service definition for a service is annotated to specify one or more virtual networks to be used for exposing backends to the service. The network controller identifies, for the specified one or more virtual networks, the corresponding one or more virtual network interfaces in each pod to be used by the service load balancer and configures the load balancer to use that virtual network interface, e.g., as a next hop.

In one example, a system includes one or more computing devices interconnected by a physical network, where each of the computing devices comprises processing circuitry coupled to a memory device. The system includes an orchestrator for a virtualized computing infrastructure, where the orchestrator is configured for execution by the computing devices. The orchestrator is configured to receive a service definition for a service implemented by load balancing service traffic for the service among a plurality of backend virtual execution elements, where the service definition specifies a first virtual network to use as a backend virtual network for the service, and to instantiate, in a selected one of the computing devices, a backend virtual execution element for the service. The system includes a network controller for the virtualized computing infrastructure, where the network controller is configured for execution by the computing devices. The network controller is configured to send, to the selected computing device, interface configuration data to configure, for the backend virtual execution element, a first virtual network interface for the first virtual network and a second virtual network interface for the second virtual network, and to configure, based on the service definition specifying the first virtual network to use as the backend virtual network for the service, a load balancer to load balance the service traffic in part to the first virtual network interface.

In another example, a method includes receiving, by an orchestrator for a virtualized computing infrastructure comprising one or more computing devices, a service definition for a service implemented by load balancing service traffic for the service among a plurality of backend virtual execution elements, where the service definition specifies a first virtual network to use as a backend virtual network for the service. The method further includes instantiating, by the orchestrator in a selected one of the computing devices, a backend virtual execution element for the service. The method further includes sending, to the selected computing device, interface configuration data to configure, for the backend virtual execution element, a first virtual network interface for the first virtual network and a second virtual network interface for the second virtual network. The method further includes specifying, based on the service definition, the first virtual network to use as the backend virtual network for the service, configuring a load balancer to load balance the service traffic in part to the first virtual network interface.

In another example, this disclosure describes an orchestrator for a virtualized computing infrastructure. The orchestrator includes one or more computing devices, where each of the computing devices comprises processing circuitry coupled to a memory device. The orchestrator is configured for execution by the computing devices. The orchestrator is configured to receive a service definition for a service implemented by load balancing service traffic for the service among a plurality of backend virtual execution elements, wherein the service definition specifies a first virtual network to use as a backend virtual network for the service, to instantiate, in a selected one of the computing devices, a backend virtual execution element for the service, and to configure, based on the service definition specifying the first virtual network to use as the backend virtual network for the service, a network controller for the virtualized computing infrastructure to configure a load balancer to load balance service traffic to a first virtual network interface, of the backend virtual element, for the first virtual network.

The techniques and system configurations of this disclosure provide one or more potential technical advantages with respect to the practical application to container-based virtualized computing infrastructures. For instance, by configuring the load balancer to use virtual network interfaces of backend pods corresponding to a particular virtual network, the techniques may improves scalability in terms of the number of pods that can be set up as backends of the load balancer. The techniques may thus facilitate the handling of service traffic for a load balancer using a single virtual network, which may improve the consistency of service traffic handling and reduce configuration management complexity. The techniques of this disclosure enable the separate handling of management data by a management interface and of service data with a data interface. That is, the handling of the service data does not tax the management interface, according to techniques and system configurations of this disclosure.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

FIG. 6 is a screenshot illustrating an example of a Kubernetes service of this disclosure.

FIG. 8 is a screenshot illustrating an example of a load balancer pool of this disclosure.

FIG. 10 is a screenshot illustrating an example of an annotated load balancer member of this disclosure.

FIG. 12 is a screenshot illustrating an example of a service IP route for another compute node, according to aspects of this disclosure.

Like reference characters denote like elements throughout the description and figures.

DETAILED DESCRIPTION

Figure 1:
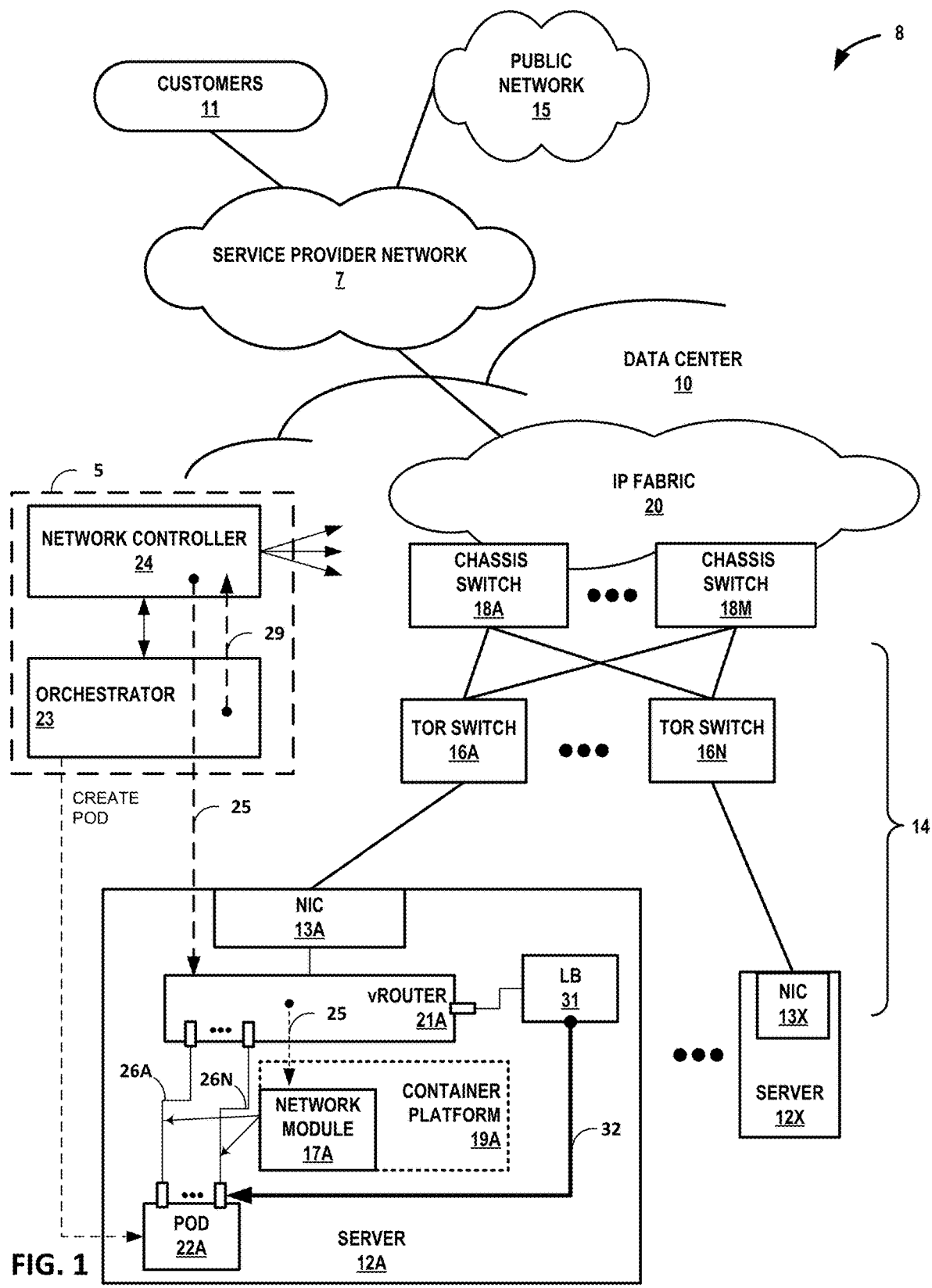
FIG. 1 is a block diagram illustrating an example computing infrastructure in which examples of the techniques described herein may be implemented.

FIG. 1 is a block diagram illustrating an example computing infrastructure 8 in which examples of the configurations and techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls.

Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes.

In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks, unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance.

The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, any of virtual routers 21 may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries.

In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks. Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network.

For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12.

In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints.

In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed 5 Jun. 2013, entitled "PHYSICAL PATH DETERMINATION FOR VIRTUAL NETWORK PACKET FLOWS;" and in U.S. patent application Ser. No. 14/226,509, filed 26 Mar. 2014, entitled "Tunneled Packet Aggregation for Virtual Networks," each of which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes provides a container management platform that provides portability across public and private clouds, each of which may provide virtualization infrastructure to the container management platform.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied.

Typically, containers within a pod have a common IP address and port space and are able to detect one another via the localhost. Because they have a shared context, containers within a pod also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers. Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Additional details are found in U.S. application Ser. No. 16/118,107, filed Aug. 30, 2018, which is incorporated herein by reference in its entirety.

Network module 17A may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17A may assign a network address (e.g., a virtual IP address for the virtual network) and may setup routes for the virtual network interface.

In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

The CNI specification specifies a number of considerations for a conforming plugin ("CNI plugin"). These include the following:

The container runtime must create a new network namespace for a container before invoking any CNI plugin.

The container runtime must then determine which networks this container should belong to, and for each network, which plugins must be executed.

The container runtime must add the container to each network by executing the corresponding plugins for each network sequentially.

In some examples, the single network module 17A configures, for pod 22A, multiple virtual network interfaces 26A-26N ("virtual network interfaces") for corresponding virtual networks configured in switch fabric 14, where any of the containers of the pod 22A may utilize, i.e., share, any of the multiple virtual network interfaces 26. In this way, and as described further below, network module 17A addresses certain limitations of CNI plugins that conform strictly to the CNI specification.

Each of virtual network interfaces 26 may represent a virtual ethernet ("veth") pair, where each end of the pair is a separate device (e.g., a Linux/Unix device), with one end of the pair assigned to pod 22A and one end of the pair assigned to virtual router 22A. The veth pair or an end of a veth pair are sometimes referred to as "ports". Each of virtual network interfaces 26 may alternatively represent a macvlan network with media access control (MAC) addresses assigned to the pod 22A and to the vrouter 21A for communications between containers of pod 22A and vrouter 21A. Each of virtual network interfaces 26 may alternatively represent a different type of interface between virtual router 21A or other network virtualization entity and virtual network endpoints. Virtual network interfaces 26 may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22A is a virtual network endpoint in multiple different virtual networks. Orchestrator 23 may store or otherwise manage configuration data for application deployments that specifies the multiple virtual networks and specifies that pod 22A (or the one or more containers therein) is a virtual network endpoint of each of the multiple virtual networks. Orchestrator 23 may receive the configuration data from a user, operator/administrator, or other machine system, for instance.

As part of the process of creating pod 22A, orchestrator 23 sends request 29 to request that network controller 24 create respective virtual network interfaces for the multiple virtual networks (indicated in the configuration data). Network controller 24 processes request 29 to generate interface configuration data 25 for the multiple virtual network interfaces 26 for pod 22A. Interface configuration data 25 may include a container or pod unique identifier and a list or other data structure specifying, for each of virtual network interface 26, network configuration data for configuring the virtual network interface. Network configuration data for a virtual network interface may include a network name, assigned virtual network address, MAC address, and/or domain name server values.

An example of network configuration data in Javascript Object Notation (JSON) format is below. The multiple virtual network interfaces 26 correspond, respectively, to the multiple virtual networks. Network controller 24 sends interface configuration data 25 to server 12A and, more specifically in some cases, to virtual router 21A. To configure one or more virtual network interfaces for pod 22A, container platform 19A may, in some implementations, invoke a single instance of network module 17A. The network module 17A obtains and processes the interface configuration data 25. For each virtual network interface specified in the interface configuration data 25, the network module 17A creates one of virtual network interfaces 26.

For example, network module 17A may attach one end of a veth pair implementing virtual network interface 26A to virtual router 21A and may attach the other end of the same veth pair to pod 22A. Similarly, network module 17A may attach one end of a veth pair implementing virtual network interface 26N to virtual router 21A and may attach the other end of the same veth pair to pod 22A. In this way, a single instance of network module 17A configures multiple virtual network interfaces 26 for one or more virtual execution element that share at least one virtual network interface, in this case pod 22A.

The following is example network configuration data for pod 22A for multiple virtual network interfaces 26A-26N, where in this case, N=3.

```
[{
    // virtual network interface 26A
    "id": "fe4bab62-a716-11e8-abd5-0cc47a698428",
    "instance-id": "fe3edca5-a716-11e8-822c-0cc47a698428",
    "ip-address": "10.47.255.250",
    "plen": 12,
    "vn-id": "56dda39c-5e99-4a28-855e-6ce378982888",
    "vm-project-id": "00000000-0000-0000-0000-000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen": ,
    "v6-dns-server": "::",
    "v6-gateway": "::",
    "dns-server": "10.47.255.253",
    "gateway": "10.47.255.254",
    "author": "/usr/bin/contrail-vrouter-agent",
    "time": "426404:56:19.863169"
},{
    // virtual network interface 26B
    "id": "fe611a38-a716-11e8-abd5-0cc47a698428",
    "instance-id": "fe3edca5-a716-11e8-822c-0cc47a698428",
    "ip-address": "30.1.1.252",
    "plen": 24,
    "vn-id": "b0951136-a702-43d2-9e90-3e5a9343659d",
    "vm-project-id": "00000000-0000-0000-0000-000000000000",
    "mac-address": "02:fe:61:1a:38:a7",
    "system-name": "tapeth1fe3edca",
    "rx-vlan-id": 65535,
    "tx-vlan-id": 65535,
    "vhostuser-mode": 0,
    "v6-ip-address": "::",
    "v6-plen":,
    "v6-dns-server": "::",
    "v6-gateway": "::",
    "dns-server": "30.1.1.253",
    "gateway": "30.1.1.254",
    "author": "/usr/bin/contrail-vrouter-agent",
    "time": "426404:56:19.863380"
},{
    // virtual network interface 26N
    "id": "fe7a52aa-a716-11e8-abd5-0cc47a698428",
    "instance-id": "fe3edca5-a716-11e8-822c-0cc47a698428",
    "ip-address": "40.1.1.252",
    "plen": 24,
    "ip6-address": "::",
    "vn-id": "200cb1e6-7138-4a55-a8df-936bb7515052",
    "vm-project-id": "00000000-0000-0000-0000-000000000000",
    "mac-address": "02:fe:7a:52:aa:a7",
    "system-name": "tapeth2fe3edca",
    "rx-vlan-id": 65535,
    "tx-vlan-id": 65535,
    "vhostuser-mode": 0,
    "v6-ip-address": "::",
    "v6-plen":,
    "v6-dns-server": "::",
    "v6-gateway": "::",
    "dns-server": "40.1.1.253",
    "gateway": "40.1.1.254",
    "author": "/usr/bin/contrail-vrouter-agent",
    "time": "426404:56:19.863556"
}]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The Add command supports only adding a single virtual network and must be invoked multiple times in order to add a pod to multiple virtual networks. A single network module 17A invoked by container platform 19A extends the functionality of a conventional CNI plugin by obtaining interface configuration data 25 and adding multiple different virtual network interfaces 26. The term "invoke" may refer to the instantiation, as executable code, of a software component or module in memory (e.g., user space 245) for execution by microprocessor 210.

In accordance with aspects of this disclosure, orchestrator 23 receives a service definition for a service, which is an abstraction that defines a logical set of pods and a policy by which to access them. A service of this type is sometimes referred to as a micro-service. Per the techniques described herein, the service definition is annotated to specify the backend virtual network to be used for exposing backends to the service, where the backends may include POD 22A. Backends may also be referred to as load balancer members in that they are members of a backend pool of virtual machine or pod/container applications. Orchestrator 23 may implement the service using a load balancer and creates a load balancer object. Network controller 24 instantiates the load balancer object as load balancer 31, illustrated here as a virtual execution element. In some examples, load balancer 31 is a specialized hardware appliance or is implemented in virtual router 21A. Load balancer 31 may be an ECMP-native load balancer and may be configured in multiple virtual routers 21. Although illustrated here as being executed by server 12A also executing pod 22A, load balancers and backends may execute on different host computing devices. Load balancer 31 may be configured in multiple host computing devices (compute nodes) 12 to cause traffic to the service IP address for the service to be load balanced among the backends.

Each pod in a service is allocated a unique IP addresses within a virtual network, and also a service IP address which is the same for all the pods in a service to use as a service address. The service IP address may be a floating IP address in some examples. The service address is used to send traffic into the service from pods in other services, or from external clients or servers. In some examples, when traffic is sent from a pod to a service IP, the virtual router 21 attached to that pod performs ECMP load-balancing using the routes to the service IP address that resolve to the interfaces of the individual backend pods that form the destination service.

The network controller 24 identifies, for the specified backend virtual network, the corresponding virtual network interface in each pod to be used by load balancer 31. In this example, virtual network interface 26N corresponds to the specified backend virtual network. However, virtual network interface 26A may be the primary virtual network interface for pod 22A. Network controller 24 configures the load balancer 31 to use virtual network interface 26N that corresponds to the specified backend virtual network, e.g., as a next hop for service traffic 32. (The next hop may be an equal-cost multipath next hop or other composite next hop.) For example, network controller 24 may configure the load balancer 31 with an identifier or a composite next hop for virtual network interface 26N that enables load balancer 31 to forward service traffic 32 to the virtual network interface 26N. In this way, orchestrator 23 and network controller 24 may facilitate consistency in service traffic handling for the service traffic for the service implemented by load balancer 31, by reducing variability in terms of the virtual network interface of a given pod is exposed to the service.

Figure 2:
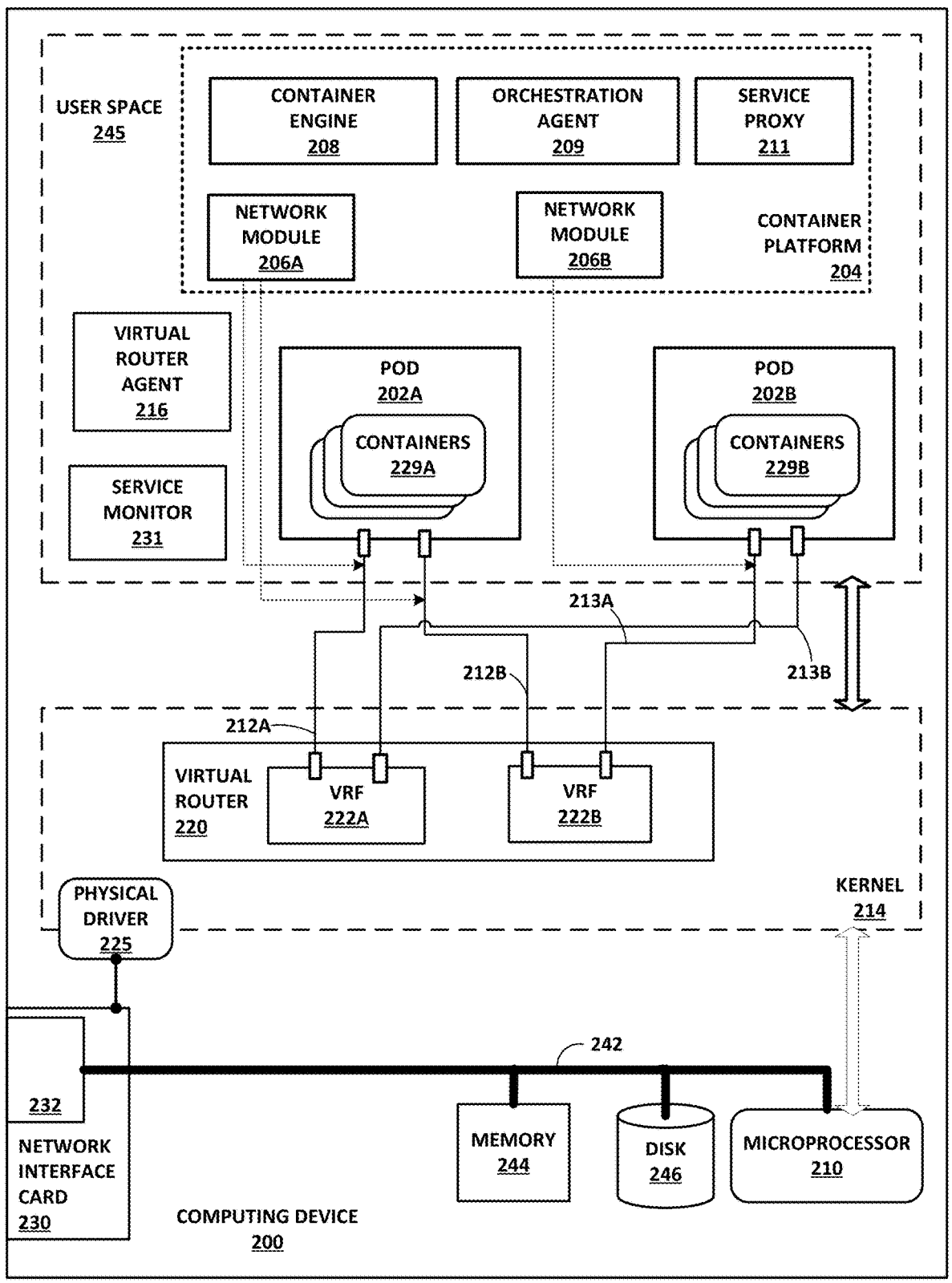
FIG. 2 is a block diagram of an example computing device, according to techniques described in this disclosure.

FIG. 2 is a block diagram of an example computing device (e.g., host) that includes a network module for configuring multiple virtual network interfaces for virtual execution elements that share at least one virtual network interface and exposing the virtual execution elements to a load balancer object using any of the multiple virtual network interfaces, according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment.

Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor). Microprocessor 210 may represent processing circuitry of various types, such as fixed function circuitry, programmable circuitry, or any combination of fixed function circuitry and programmable circuitry that is operable to execute instructions stored to volatile or non-volatile memory to perform various actions.

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In general, each of pods 202A-202B may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of an IP address of the computing device 200 on which the pod 202B. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to control create virtual networks and configure network virtualization endpoints, such as computing device 200 and, more specifically, virtual router 220, as a well as virtual network interfaces 212, 213. By configuring virtual router 220 based on information received from network controller 24, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as "tunneling," and may be used to create one or more overlay networks. Besides IPinIP, other examples of tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As described above, network controller 24 illustrated in FIG. 1 may provide a logically centralized controller for facilitating operation of one or more virtual networks. Network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints.

In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to POD 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. In this example, container 229A sends the layer 3 inner packet to virtual router 220 via virtual network interface 212A attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network.

Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of pods 202 to cause the virtual machines 224 to use virtual router 220 as an initial next hop for outbound packets. In some examples, NIC 230 is configured with one or more forwarding rules to cause all packets received from virtual machines 224 to be switched to virtual router 220. Pods 202A-202B may represent example instances of pod 22A of FIG. 1, in further detail. Pod 202A includes one or more containers 229A, and pod 202B includes one or more containers 229B.

Container platform 204 may represent an example instance of container platform 19A of FIG. 1, in further detail. Container platform 204 include container runtime 208, orchestration agent 209, service proxy 211, and network modules 206A-206B. Each of network modules 206A-206B may represent an example instance of network module 17A of FIG. 1, there being invoked one network module 206 per pod 202.

Container engine 208 includes code executable by microprocessor 210. Container runtime 208 may represent one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 209, container engine 208 may obtain images and instantiate them as executable containers 229A-229B in pods 202A-202B.

Service proxy 211 includes code executable by microprocessor 210. Service proxy 211 may represent one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file sent to orchestration agent 209 from orchestrator 23 or indirectly received via a command line interface, HTTP endpoint, or HTTP server. Container specification data may be a pod specification (e.g., a PodSpec-a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200. Orchestration agent 209 may also be considered or referred to as a "kube manager"

Orchestration agent 209 may instantiate a single one of network modules 206 to configure one or more virtual network interfaces for each of pods 202. Each of network modules 206 may represent an example instance of network module 17A of FIG. 1. For example, orchestration agent 209 may receive a container specification data for pod 202A and direct container engine 208 to create the pod 202A with containers 229A based on the container specification data for pod 202A.

Orchestration agent 209 also invokes the single network module 206A to configure, for pod 202A, multiple virtual network interfaces 212A-212B for virtual networks corresponding to VRFs 222A-222B, respectively. In a similar manner, orchestration agent 209 directs container engine 208 to create the pod 202B with containers 229B based on the container specification data for pod 202B. Orchestration agent 209 also invokes the single network module 206B to configure, for pod 202B, virtual network interface 213A and 213B for virtual networks corresponding to each of VRFs 222A and 222B. In this example, both pod 202A and pod 202B are virtual network endpoints for the virtual network corresponding to VRF 22B. Any of virtual network interfaces 212, 213 may represent an example instance of one of virtual network interfaces 26 described in FIG. 1.

Network module 206A may obtain interface configuration data for configuring virtual network interfaces for pods 202. Virtual router agent 216 operates as a virtual network control plane module for enabling network controller 24 to configure virtual router 220. Unlike the orchestration control plane (including the container platforms 204 for minion nodes and the master node(s), e.g., orchestrator 23), which manages the provisioning, scheduling, and managing virtual execution elements, a virtual network control plane (including network controller 24 and virtual router agent 216 for minion nodes) manages the configuration of virtual networks implemented in the data plane in part by virtual routers 220 of the minion nodes.

Virtual router agent 216 communicates, to network modules 206, interface configuration data for virtual network interfaces to enable an orchestration control plane element (i.e., network module 206) to configure the virtual network interfaces according to the configuration state determined by the network controller 24, thus bridging the gap between the orchestration control plane and virtual network control plane. In addition, this may enable a single network module 206A to obtain interface configuration data for multiple virtual network interfaces for a pod and configure the multiple virtual network interfaces, which may reduce communication and resource overhead inherent with invoking a separate network module 206 for configuring each virtual network interface.

Computing device 200 generates a composite equal-cost multi-path routing (ECMP) next-hop scheme using configurable/customizable endpoint selections, according to aspects of this disclosure. One example workflow according to which computing device 200 generates the ECMP next-hop scheme using configurable endpoint selections is described below. First, orchestration agent 209 configures, for each of pods 202, multiple virtual network interfaces 212 and 213 for virtual networks corresponding to VRFs 222A-222B, respectively. Next, network controller 24 sends any configuration updates to the hosts included in pods 202.

The hosts of pods 202 advertise their respective next-hop routes to network controller 24, using a service IP address associated with service monitor 231 of computing device 200. Network controller 24 aggregates the next-hop routes received from the hosts of pods 202, to form the consolidated ECMP next-hop scheme for pods 202. Network controller 24 sends the ECMP next-hop information to all of pods 202. Using the relevant portions of the ECMP next-hop composite, each of pods 202 can provide the service IP to a selected VRF 222. In turn, each of pods 202 can advertise/expose a particular selected virtual network connection 212 or 213 (based on the particular VRF 222 to which the service IP was provided) to the load balancer member object created by orchestration agent 209.

Figure 3:
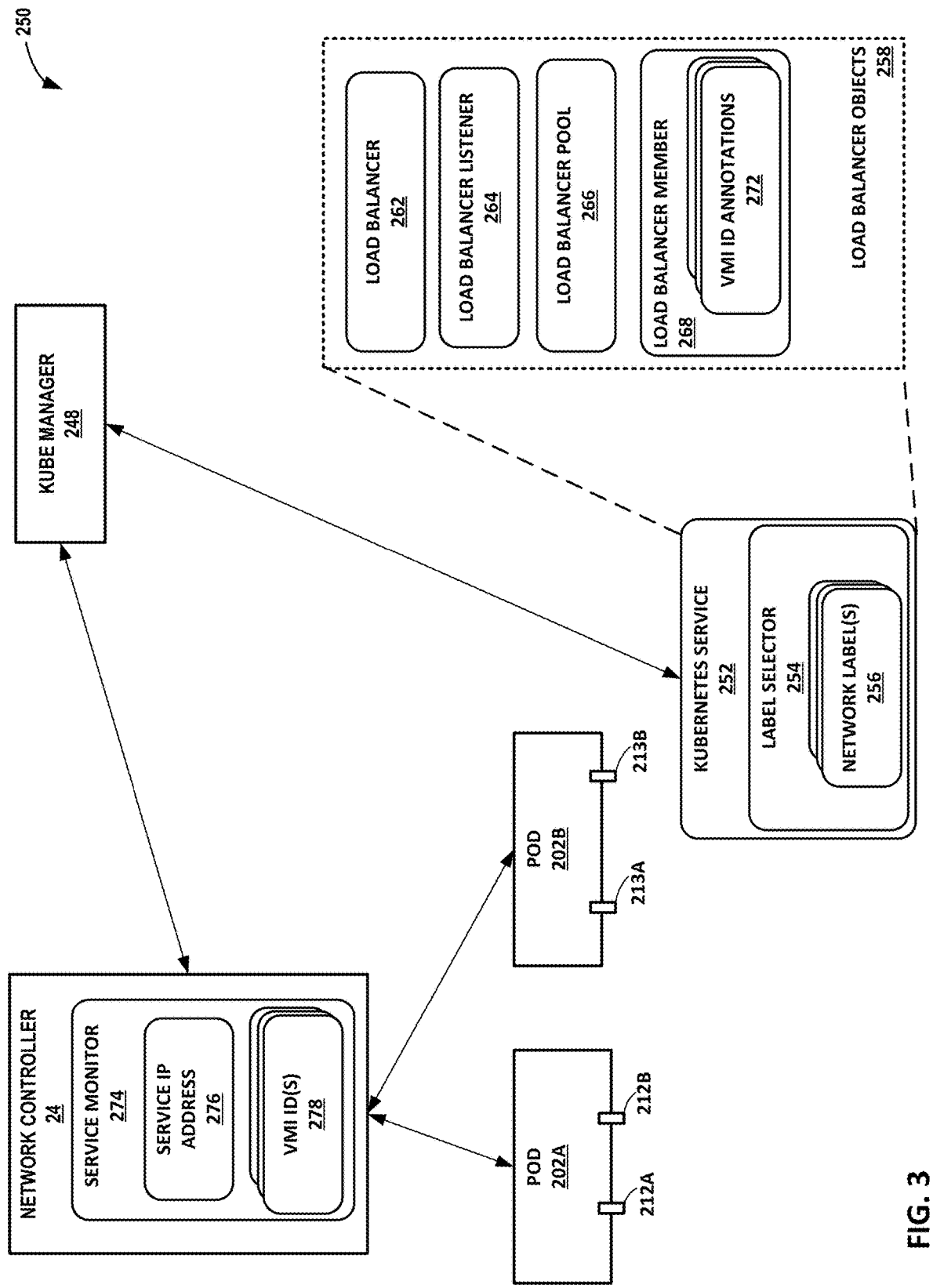
FIG. 3 is a conceptual diagram illustrating a system that implements configurable endpoint techniques of this disclosure.

FIG. 3 is a conceptual diagram illustrating a system 250 that implements configurable endpoint techniques of this disclosure. Some elements of FIG. 3 correspond to similarly-numbered elements of FIGS. 1 and 2. In some examples, Kube manager 248 implements functionalities that overlap, partially or entirely, with those of network controller manager 325 illustrated in FIG. 4. Kube manager 248 obtains, via network controller 24, virtual network identifiers 212 and 213 associated with pods 202.

Kube manager 248 generates Kubernetes service 252. In some, examples, Kubernetes service 252 represents an L4 load balancer. Kubernetes service 252 includes a label selector 254 that makes selections from network labels 256. Network labels 256 identify endpoint networks associated with VRFs 222. For example, Kubernetes service 252 invokes label selector 254 to select one of network labels 256 with which to configure portions of load balancer objects 258, in accordance with aspects of this disclosure. In accordance with its L4 load balancer configuration, Kubernetes service 252 includes four objects, which are illustrated n FIG. 3 as being part of load balancer objects 258. In some examples, load balancer objects 258 represent load balancer objects provided by the Contrail® family of products from Juniper® Networks, Inc. That is, Kube manager 248 listens for the event of label selector 254 selecting one of network labels 256, and in response, creates load balancer objects 258, with the VMI ID annotations 272 to represent the particular virtual network interfaces 212, 213 by which pods 202 are linked to the selected virtual network.

In the example of system 250, load balancer objects 258 include a load balancer object 262, a load balancer listener object 264, a load balancer pool object 266, and a load balancer member object 268. Load balancer object 262 polls the service IP address associated with Kubernetes service 252. As described above, the service IP address of Kubernetes service 252 provides a consistent mechanism to access each of pods 202, despite the non-deterministic nature of the IP address of each of pods 202. Load balancer listener object 264 holds port number information associated with Kubernetes service 252. Load balancer pool object 266 holds a link to load balancer member object 268.

According to aspects of this disclosure, Kube manager 248 annotates load balancer member object 268 using VMI ID annotation(s) 272. More specifically, Kube manager 248 forms VMI ID annotations 272 based on the particular virtual network interfaces 212, 213 that correspond to the particular network label(s) 256 selected by label selector 254. As noted above, in accordance with the configurations of this disclosure, VMI ID annotations 272 may, but need not necessarily, map to the first (or default) virtual network interface 212, 213 of pods 202. As such, Kube manager 248 may use VMI ID annotation(s) 272 to expose one or more of pods 202 to Kubernetes service 252 using a configurable endpoint, rather than simply exposing the respective pod 202 using a default (e.g., first) endpoint, based on the particular network label 256 selected by label selector 254. VMI ID annotations 272 may include a different annotation for each of pods 202. Again, each virtual network interface 212, 213 is linked to a different VMI ID, and therefore, VMI ID annotations 272 are virtual network interface-specific, when referring to a particular virtual network interface 212, 213 of pods 202.

By exposing one or more of pods 202 to Kubernetes service 252 using a selected one of the multiple virtual network interfaces 212, 213 rather than a default selection, the techniques and system configurations of this disclosure provide various technical improvements in the practical application of container-based multi-environment computing. As one example, Kube manager 248 enables the separate handling of management data by a management interface and of service data with a data interface. That is, Kube manager 248 may implement the techniques of this disclosure such that the handling of the service data does not tax the management interface, according to techniques and system configurations of this disclosure.

Kube manager 248 avails of a single selected network label 256 (which, in turn, maps to a single VRF 222) to identify a respective VMI ID annotation 272. Each such VMI ID annotation 272 can be shared by multiple pods 202, and may fall anywhere in the order of virtual network interfaces 212, 213, which can number over ten in the case of a single pod 202 in some scenarios. In this way, Kube manager 248 configures Kubernetes service 252 to link to potentially numerous backends (pods 202) using a single VMI ID annotation 272.

Additionally, Kube manager 248 implements the techniques of this disclosure to improve data precision and efficiency of use of the containers of pods 202. By exposing pods 202 to Kubernetes service 252 using a particular virtual network interface 212, 213 instead of using a primary interface as a default, Kube manager 248 improves data precision. That is, each of pods 202 is linked to Kubernetes service 252 according to a VMI ID annotation 272 that accurately identifies the particular VRF 222 over which the functionalities of the pod 202 are conducted, with respect to Kubernetes service 252. In instances in which Kubernetes service 252 is one of multiple Kubernetes services, Kube manager 248 improves network load balancing by assigning individual endpoint networks to each of the Kubernetes services, thereby alleviating the load on the primary network for each of pods 202.

As shown in FIG. 3, network controller 24 of includes a service monitor 274. Service monitor 274 listens for config updates generated via load balancer objects 258. Service monitor 274 holds all of the VMI IDs associated with virtual network interfaces 212, 213 (VMI IDs 278). Service monitor 274 also generates service IP address 276, and links service IP address 276 to VMI IDs 278. From a configuration perspective, the linking of service IP address 276 to all of VMI IDs 278 represents a configuration update or "config update." Network controller 24 pushes the config update to virtual router agent 216, and virtual router agent 216 uses the config update in determining the next-hop information for pods 202.

Figure 4:
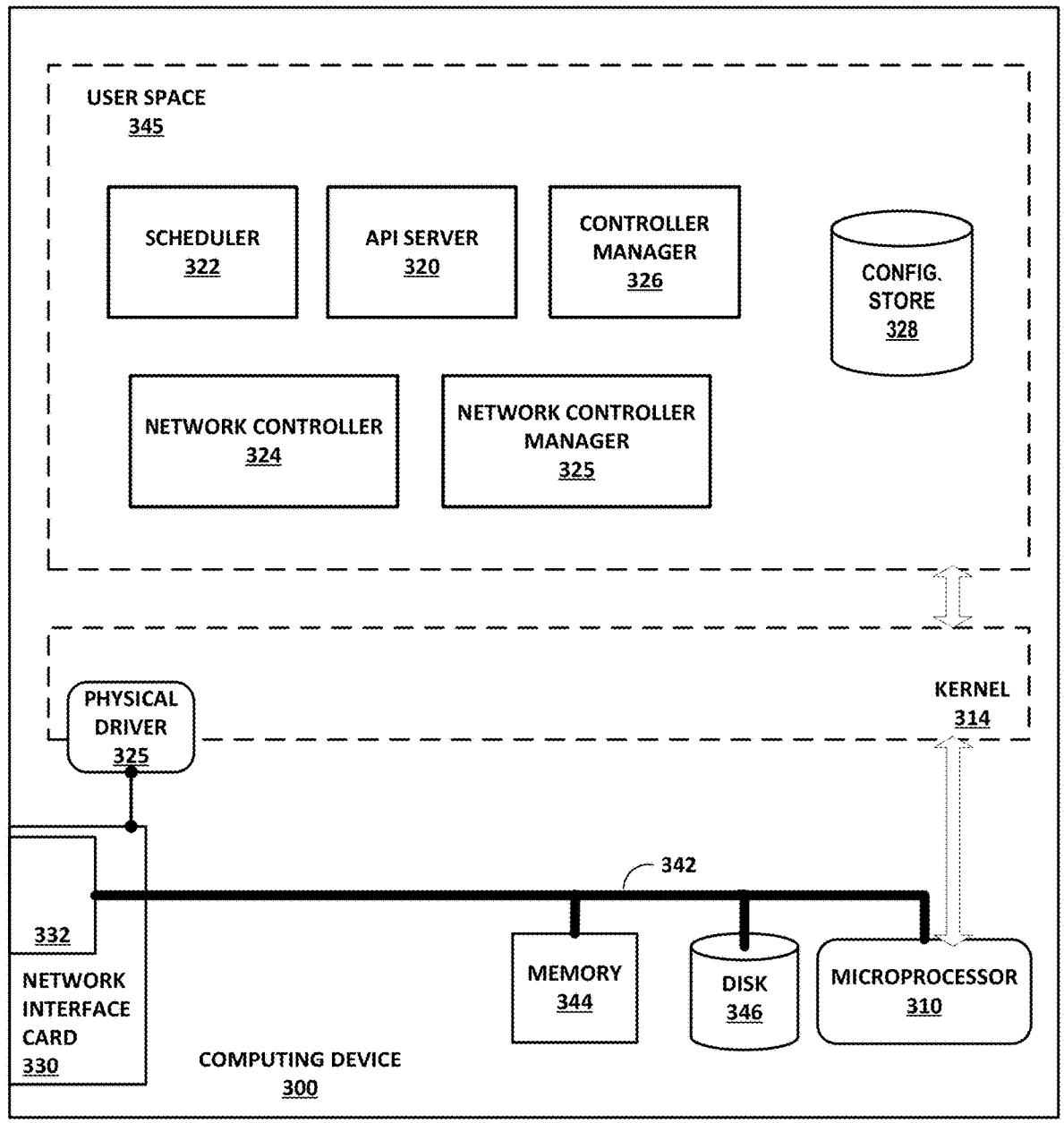
FIG. 4 is a block diagram of an example computing device operating as an instance of controller for a virtualized computing infrastructure, according to techniques described in this disclosure.

FIG. 4 is a block diagram of an example computing device operating as an instance of controller for a virtualized computing infrastructure. Computing device 300 an example instance of controller 5 for a virtualized computing infrastructure. Computing device 300 of FIG. 4 may represent one or more real or virtual servers configured to perform operations for at least one of a network controller 24 and an orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, network controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller manager 325 may represent an example implementation of a Kubernetes cloud controller manager. Network controller 324 may represent an example instance of network controller 24.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such as virtual router 220 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by microprocessor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks. Additional information regarding network controller 24 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

The following example deployment configuration for this application consists of a pod and the virtual network information for the pod:

```
apiVersion: v1
kind: Pod
metadata:
  name: multi-net-pod
  annotations:
    networks: '[
      { "name": "red-network" },
      { "name": "blue-network" },
      { "name": "default/extns-network" }
    ]'
spec:
  containers:
    image: busybox
    command:
      sleep
      "3600"
    imagePullPolicy: IfNotPresent
    name: busybox
    stdin: true
    tty: true
  restartPolicy: Always
```

This metadata information is copied to each pod replica created by the controller manager 326. When the network controller manager 325 is notified of these pods, network controller manager 325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network. In accordance with techniques described herein, network controller manager 325 may drive the creation of multiple virtual network interfaces per-pod replica using a single network module 206A for configuring the pod replica host.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 5:
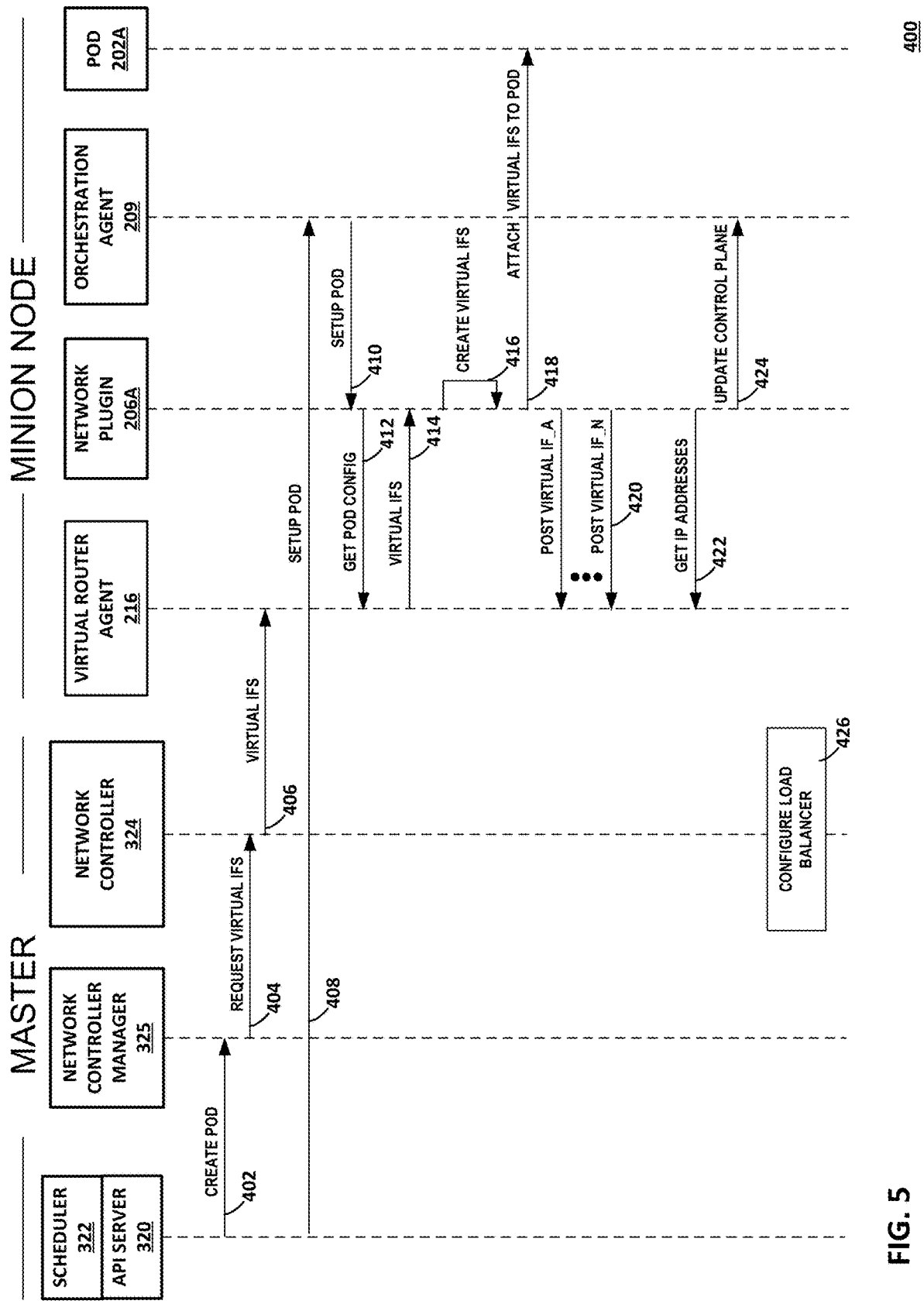
FIG. 5 is a flow diagram illustrating the example creation of multiple network virtual interfaces for a virtual execution element, according to techniques described in this disclosure.

FIG. 5 is a flow diagram illustrating example creation of multiple network virtual interfaces for a virtual execution element using a single network module, according to techniques described in this disclosure. For purposes of example, the operations are described with respect to components of computing devices 200 and 300 of FIGS. 2 and 4 and system 250 of FIG. 3. API server 320 receives a request to instantiate a pod 202A and modifies the configuration store 328 by generating and storing configuration information for creating the pod 202A (402). Scheduler 322 may select the computing device 200 as the host minion node for the pod 202A. API server 320 may annotate the pod 202A with a list of multiple virtual networks and a uuid for the pod (pod_uuid). Other forms of identifiers for the pod may be used. The annotations may be labels for the pod configuration that indicate the virtual networks, such as "virtual network A" and "virtual network B".

Network controller manager 325 listens for new objects from API server 320 and determines that pod 202A is to be instantiated on computing device 200 and determines, from the annotations, that the pod 202A requires virtual network interfaces with the multiple virtual networks indicated in the annotations. The listening may be in response to subscribing to API server 320 notifications on a RESTful interface, for example.

Network controller manager 325 directs network controller 324 to create the virtual networks and to create virtual network interfaces for the pod 202A for the virtual networks (404). Network controller manager 325 may annotate the pods with respective uuids for the one or more virtual network interfaces (e.g. vni_uuids) to be created by network controller 324 as well as the allocated, respective unique private virtual network addresses (and in some cases MAC addresses). Other forms of identifiers for the virtual network interfaces may be used.

Network controller 324 may associate virtual network interfaces with the pod in interface configuration 25 for the pod 202A. For example, network controller 324 may create a list of virtual network interfaces for the virtual networks and may associate the vni_uuids with the pod_uuid in interface configuration data 25 for pod 202A. The vni-uuids may be another identifier for the virtual network interfaces, such as virtual machine interface identifiers. Network controller 324 may send the interface configuration data 25 to the virtual router agent 216 for virtual router 220 of computing device 200 and configure corresponding virtual network interfaces 212A, 212B in the computing device 200 (406). Virtual router agent 216 may store an association of each vni_uuid with the corresponding configured virtual network interface.

To setup the pod 202A, orchestration agent 209 obtains container specification data for pod 202A and ensures the containers execute by computing device 200 (408). The container specification data may include the pod_uuid for pod 202A. The orchestration agent 209 invokes a single network plugin 206A to configure the virtual network interfaces for the pod 202A (410). Network plugin 206A requests (412) and obtains the interface configuration data 25 from virtual router agent 216 (414). Network plugin 206A may obtain the interface configuration data 25 from virtual router agent 216 by requesting the interface configuration data for the pod corresponding to the pod_uuid included in the container specification data for pod 202A.

To create each of the virtual network interfaces 212A, 212B indicated in interface configuration data 25 (416), network plugin 206A may insert the virtual network interface into the pod 202A network namespace (e.g., one end of a veth pair that is the virtual network interface) (418) and may make any necessary changes on the computing device 200 (e.g. attaching the other end of the veth pair into virtual router 220—this end may have been previously attached to another bridge).

Network plugin 206A notifies virtual router agent 216 of the now-operational (by virtue of insertion into pod 202A) virtual network interfaces 212A, 212B (420). Network plugin 206A may also obtain the virtual network addresses from the virtual router agent 216, which may proxy the DHCP requests (422) or by invoking an appropriate IPAM plugin. Network plugin 206A may configure the virtual network addresses inside the pod 202A network namespace and may setup routes by invoking the virtual router agent 216. Virtual router agent 216 installs routes to the pod 202A's IP and MAC addresses for each virtual network interface 26 with a next hop of the virtual network interface 26. Virtual router agent 216 may assign a label for each virtual network interface 26 and install a corresponding label route in the MPLS table. Virtual router 216 may send an XMPP or other messages to the network controller 24 containing routes to the new pod 202A virtual network interfaces 26. The route for a virtual network interface 26A has a next hop of the IP address of the server 21A that the virtual router 21A is running on, and the route may specify an encapsulation protocol using the label that was just allocated. For virtual network interface 26N that is a virtual network interface for the specified backend virtual network for the service, the route may also specify the service IP address allocated to pod 202A. Network controller 24 distributes the routes to virtual network interfaces 26 to other virtual routers 21 having pods with virtual network interfaces in the same virtual networks, as allowed by network policy. If the route includes a service IP address, as the route for virtual network interface 26N may include, the virtual router agent 216 adds (or creates) the route to the load balancer (e.g., by adding the route to an ECMP next hop in virtual routers 21). In this way, virtual routers 21 can load balance service traffic to pod 202A via virtual network interface 26N. Network controller 24 also sends routes for the other pods in the virtual networks for virtual network interfaces, as allowed by policy, to virtual router 21A.

Alternatively, network plugin 206A may configure the virtual network addresses inside the pod 202A network namespace and may setup routes consistent with the IP Address Management section by invoking an appropriate IPAM plugin. Network plugin 206A may update the orchestration control plane by notifying orchestration agent 209 (424).

Virtual router agent 216 may provide the virtual network interfaces 26 to network controller 324, e.g., using identifiers or as composite next hops. Network controller 324 configures a load balancer for a service 252, in which label selector 254 selects one of network labels 256 (426). Using the selected network label 256, Kubernetes service 252 generates load balancer member object 268 to include the respective VMI ID annotations 272 that denote the particular virtual network interfaces through which each of pods 202 is linked to the network corresponding to the selected network label 256. Network controller 324 invokes service monitor 274, which uses the configurable endpoints (represented by the virtual network interfaces indicated by VMI ID annotations 272) to form VMI IDs 278 to be linked to service IP address 276.

Various techniques described herein enable a user to provide a list of networks as an annotation in the pod 202A YAML. The network controller manager 325 may parse this list of networks and create the respective ports in the virtual router 220. When the pod 202A is scheduled on computing device 200, the network plugin 206A may query the virtual router agent 216 for ports. The virtual router agent 216 will respond back with a list of ports, and for every member of this list, the network plugin 206A will create the tap interface and attach the tap interface to pod 202A. Because all of the virtual network interfaces 212A, 212B are created in a single call flow, this may provide better performance in creating the virtual network interfaces and attaching them to pods. Containers 229A may communicate via either of virtual network interfaces 212A, 212B to exchange packets with other pods of the cluster on the corresponding networks, or externally to the virtual networks and pods of the cluster using, e.g., a gateway.

In some cases, the techniques may enable running different container network functions such as a containerized security device or a containerized router in a computing infrastructure using an orchestration platform. The container network functions may be such that ordinarily require network interfaces for multiple networks, again, such as routers, NAT devices, packet analyzer, and firewalls or other security devices. The techniques may therefore enable service chaining with a container orchestration platform for a container-centric computing infrastructure.

For example, any one or more of containers 229A may represent a containerized network function or containerized network function virtualization (NFV) instance. Container 229A of pod 202A has virtual network interface 212A with a first virtual network corresponding to VRF 222A and a virtual network interface 212B with a second virtual network corresponding to VRF 222B. Other containerized applications executing in pods on computing device 200 or other minion nodes of the cluster and that have virtual network interfaces in the first virtual network or the second virtual network can exchange packets with container 229A and the containerized network function. A service chain of one or more containerized network functions may apply a sequence of services to network packets that traverse the service chain. The VRFs 222 of virtual routers 220 for the minion nodes may be configured to cause traffic forwarding along the sequence of services, such as by configuring service VRFs for the containerized network functions to use as left VRFs for the service.

In one example use case, for a two-tier application with a frontend and a database backend, the frontend pod can be configured as a virtual network endpoint for virtual network A (corresponding to VRF 222A) and the database pod can be configured as a virtual network endpoint for virtual network B (corresponding to VRF 222B). A containerized firewall may be deployed as the container 229A instance of pod 202A. Virtual network interface 212A is an interface for virtual network A, and virtual network interface 212B is an interface for virtual network B. Packets received at virtual network interface 212A from the frontend pod may be processed by the containerized firewall and output via virtual network interface 212B over virtual network B to the backend database pod.

The techniques of this disclosure enable Kube manager 248 (an example of network controller manager 325) to implement Kubernetes service 252 using a custom-selected virtual network interface 212, 213 for each of pods 202, rather than using a default virtual network interface 212, 213. Because each of virtual network interfaces 212, 213 is linked to a different virtual network, orchestration agent 209 implements the techniques of this disclosure to designate a particular virtual network (in this case, A or B) by selecting from network labels 256. Using the selected one of network labels 256, Kube manager 248 generates Kubernetes service 252 such that load balancer member 268 includes VMI ID annotations 272 that specify the particular virtual network interface 212, 213 that links the respective pod 202 to the selected virtual network. In turn, service monitor 274, which listens for config updates generated by Kubernetes service 252, uses the VMI ID annotations 272 of the config update to populate VMI IDs 278. In this way, Kube manager 248 implements the techniques of this disclosure to configure Kubernetes service 252 using custom-selected virtual network interfaces for each of pods 202, instead of relying on a default virtual network interface selection.

An example of a Kubernetes replication controller YAML file is presented below, in a use case scenario in which pods 202 can be linked to multiple VRFs 222. The virtual networks corresponding to VRFs 222 are color-coded in this case. That is, network labels 256 correspond to a unique color code assigned to each virtual network associated with VRFs 222.

apiVersion: v1
kind: ReplicationController
metadata:
  name: multi-intf-nginx
spec:
  replicas: 3
  template:
    metadata:
      labels:
        run: nginx
      annotations:
        k8s.v1.cni.cncf.io/networks: '[
          { "name": "green" },
          { "name": "red" },
          { "name": "white" }
        ]'
spec:
  containers:
  name: nginx
  image: nginx
  ports:
    containerPort: 80

An example of a Kubernetes service YAML file is presented below, in a use case scenario in which one or more endpoint networks is/are associated with Kubernetes service 252. The backend network in the use case scenario below is the virtual network with the network label 256 corresponding to the "white" color code in the Kubernetes replication controller YAML file above.

apiVersion: v
kind: Service
metadata:
  labels:
    run: nginx
  name: nginx
  namespace: default
  annotations:
    k8s.v1.cni.cncf.io/endpoint.networks: '[
      { "name": "white" }
    ]'
spec:
  ports:
  port: 80
  protocol: TCP
  targetPort: 80
  selector:
  run: nginx
  type: ClusterIP
status:
  loadBalancer: { }

Figure 6:
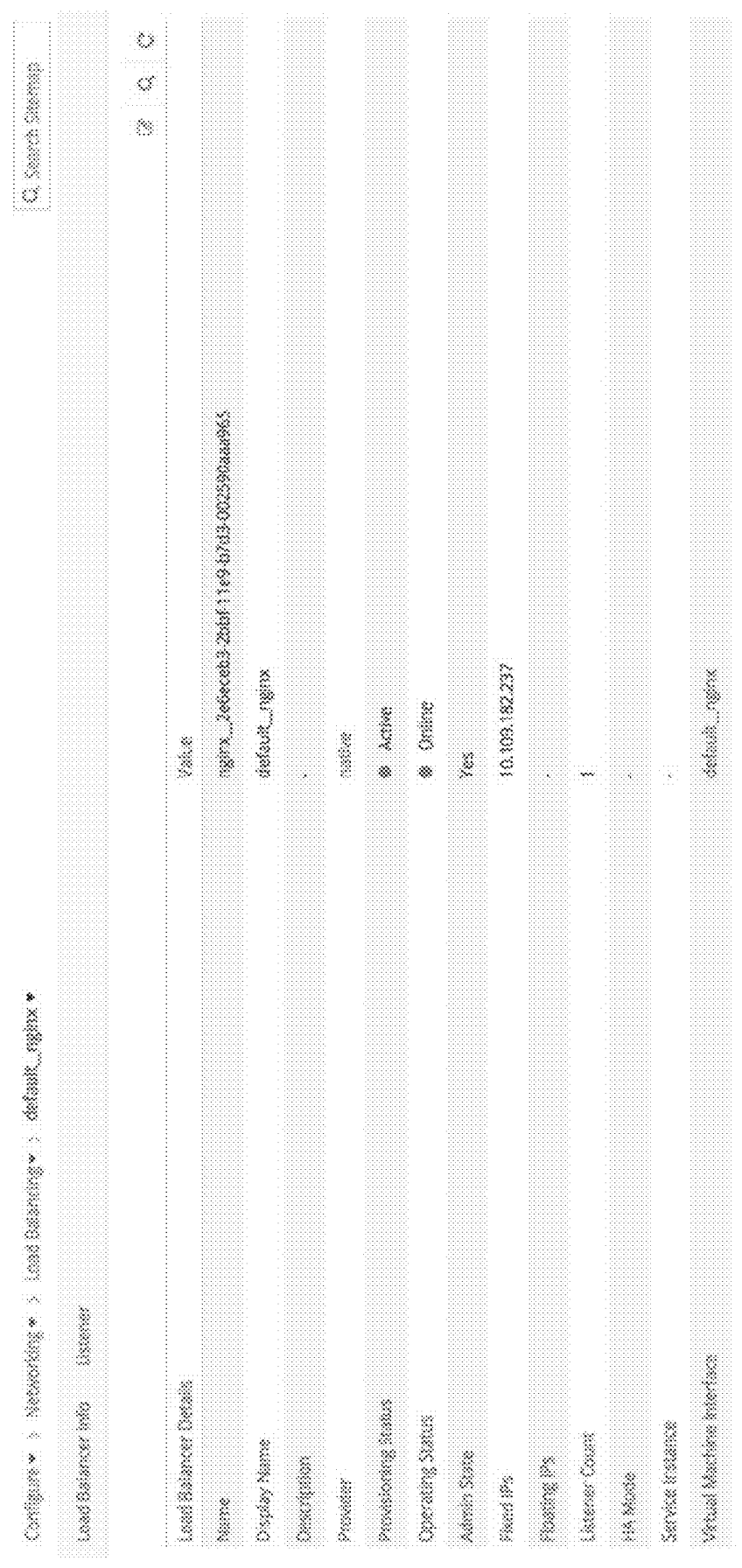

FIG. 6 is a screenshot illustrating an example of a Kubernetes service of this disclosure. The Kubernetes service of FIG. 6 is an example of a contrail ECMP load balancer of this disclosure.

Figure 7:
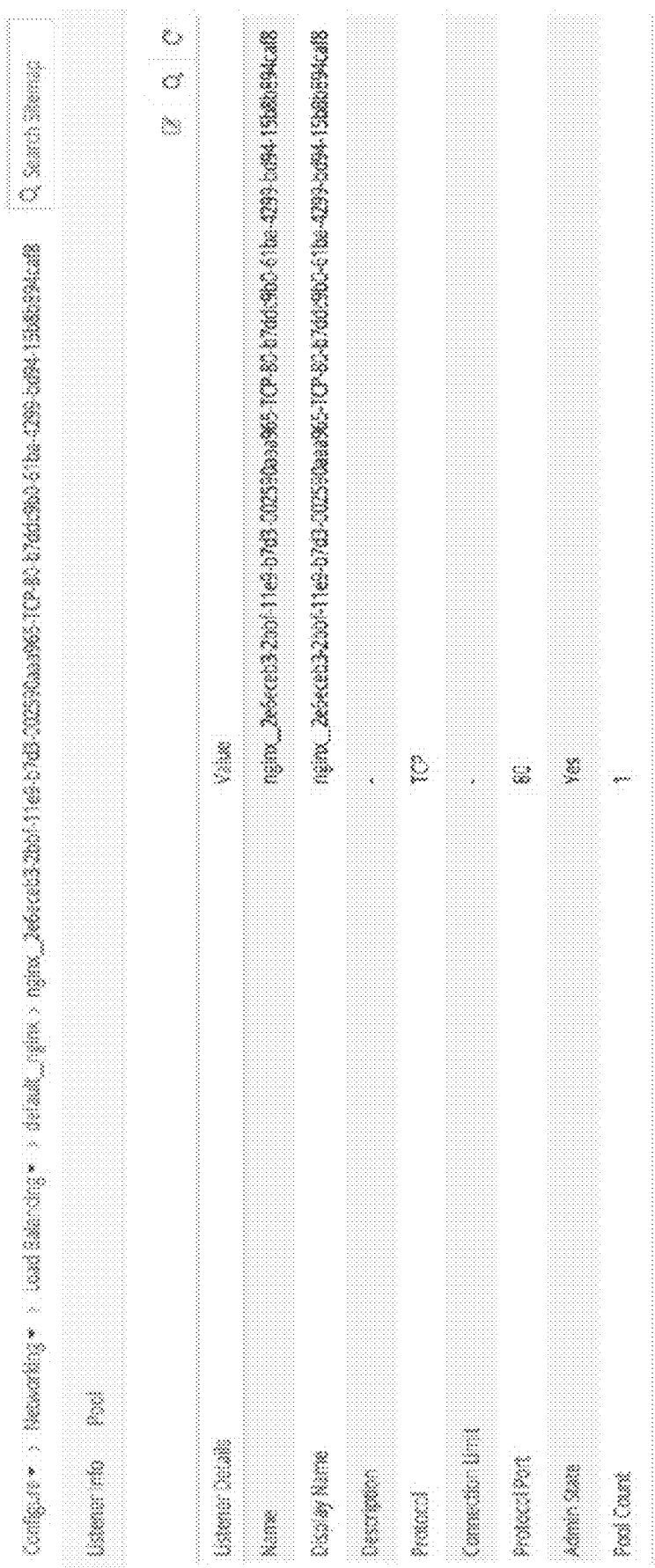
FIG. 7 is a screenshot illustrating an example of one or more load balancer listeners of this disclosure.

FIG. 7 is a screenshot illustrating an example of one or more load balancer listeners of this disclosure.

Figure 8:
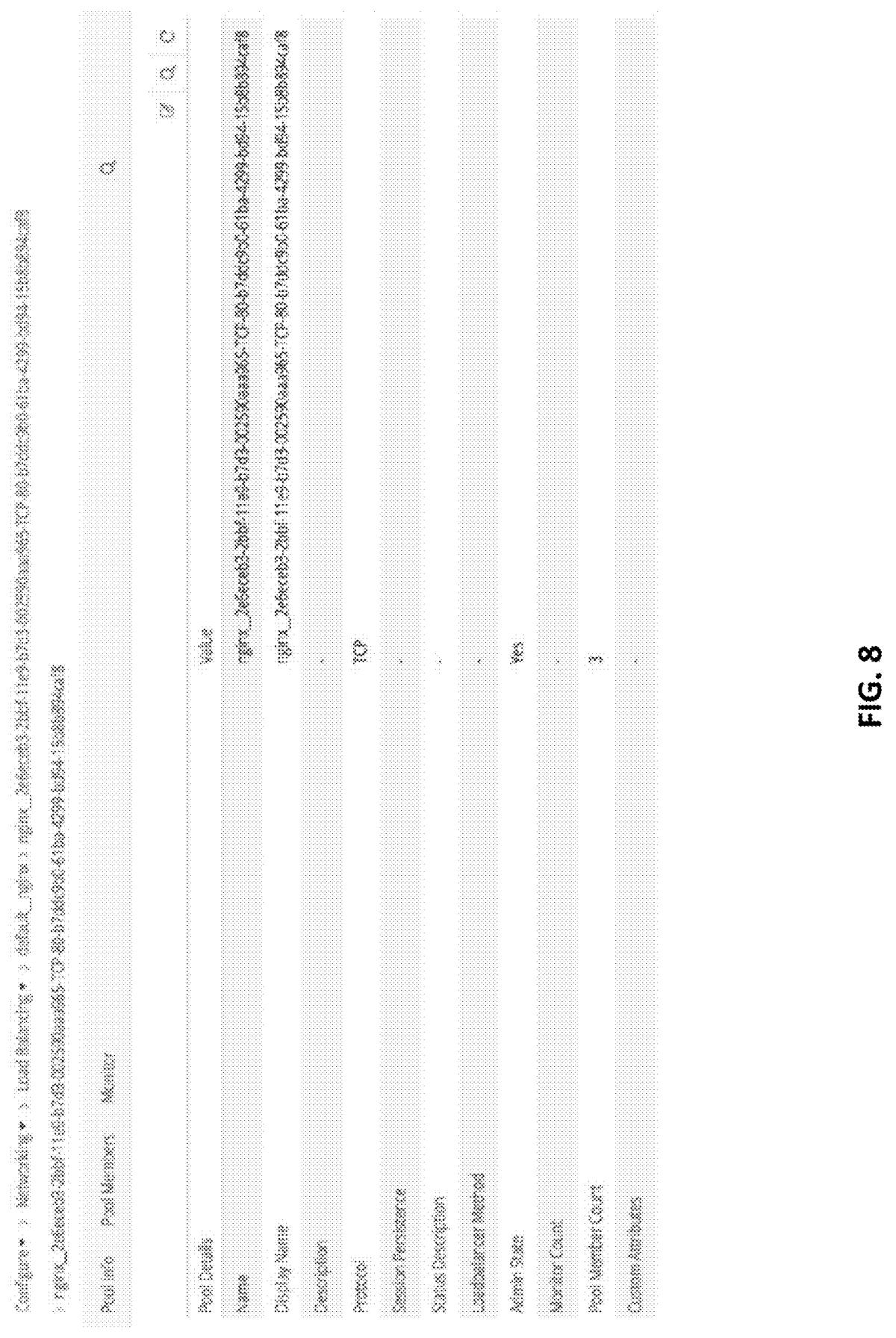

FIG. 8 is a screenshot illustrating an example of a load balancer pool of this disclosure.

Figure 9:
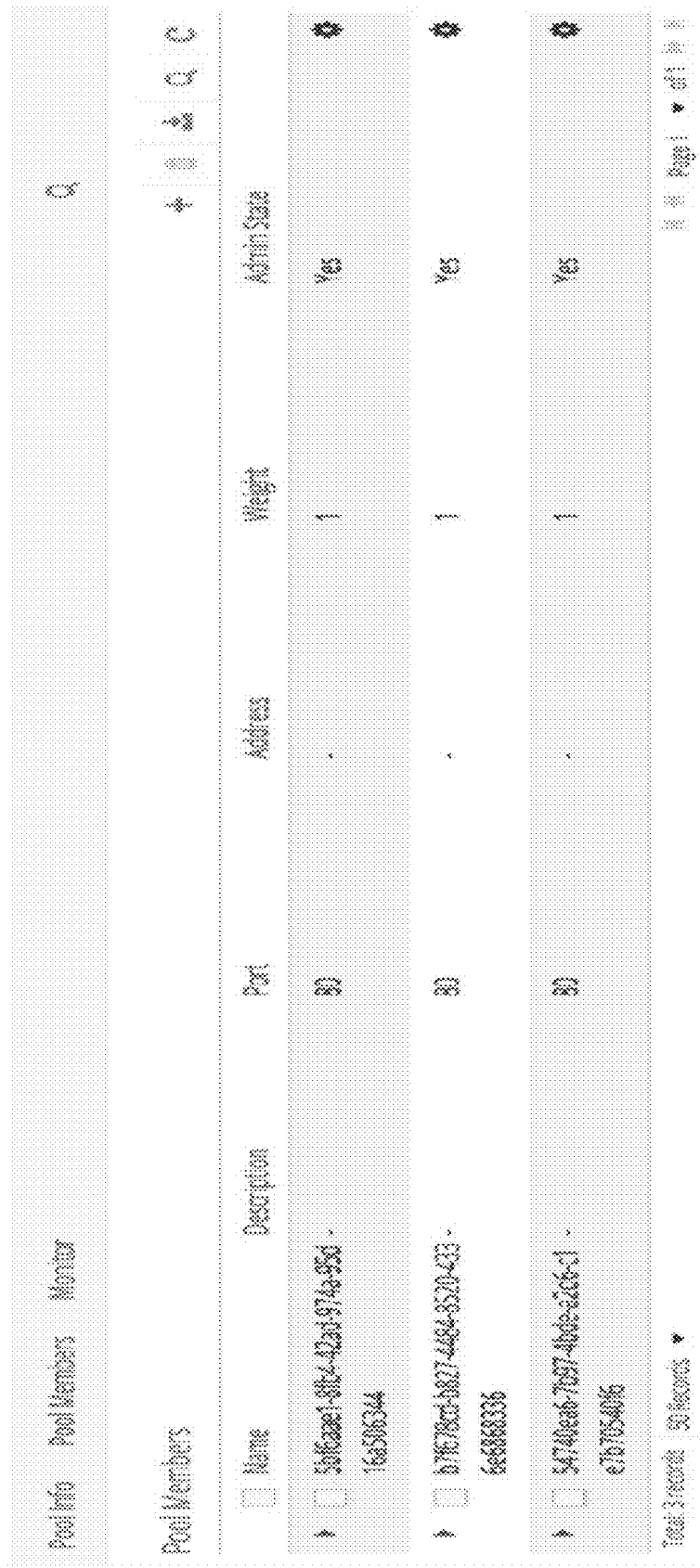
FIG. 9 is a screenshot illustrating an example of one or more load balancer members of this disclosure.

FIG. 9 is a screenshot illustrating an example of one or more load balancer members of this disclosure.

Figure 10:
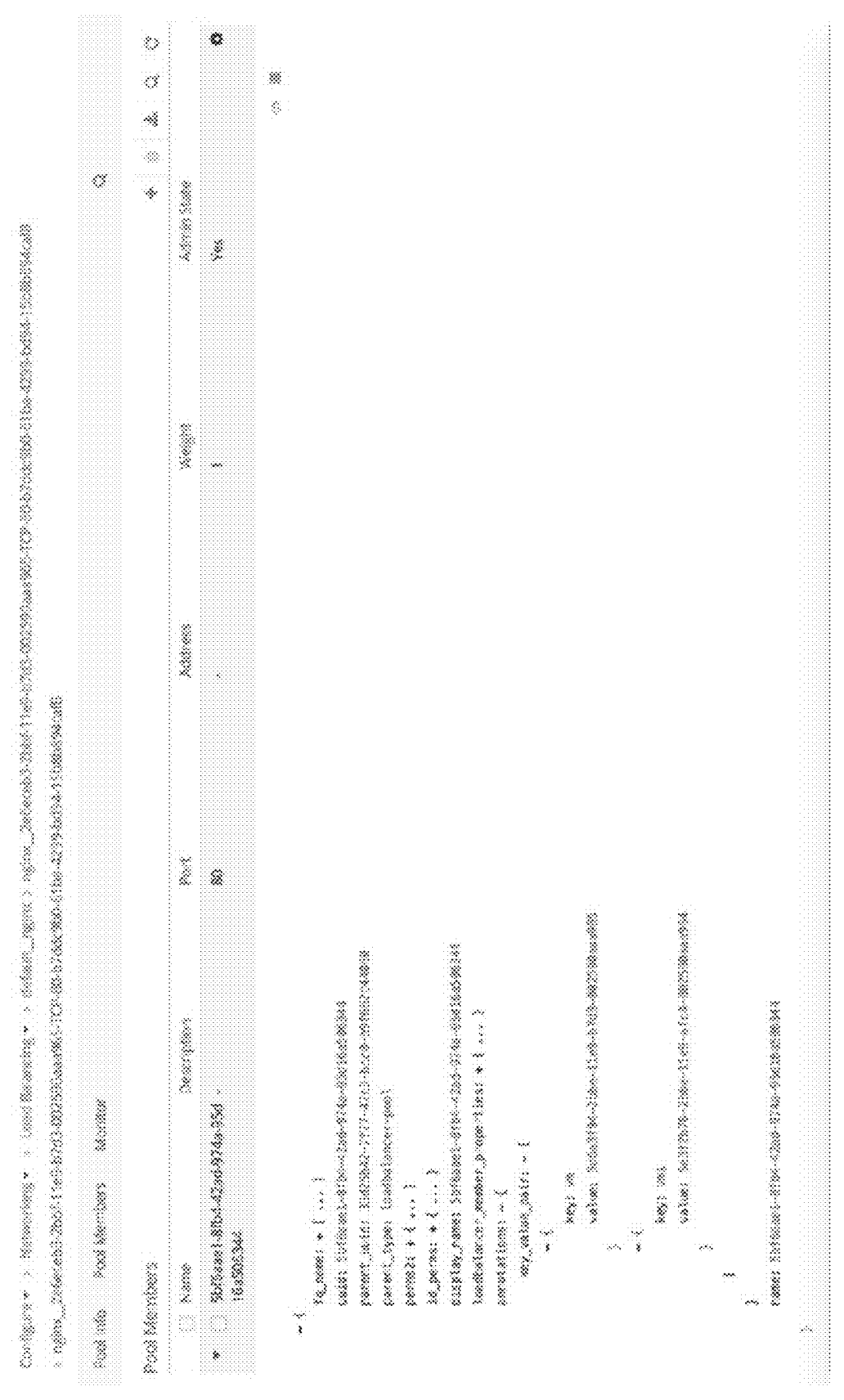

FIG. 10 is a screenshot illustrating an example of an annotated load balancer member of this disclosure.

Figure 11:
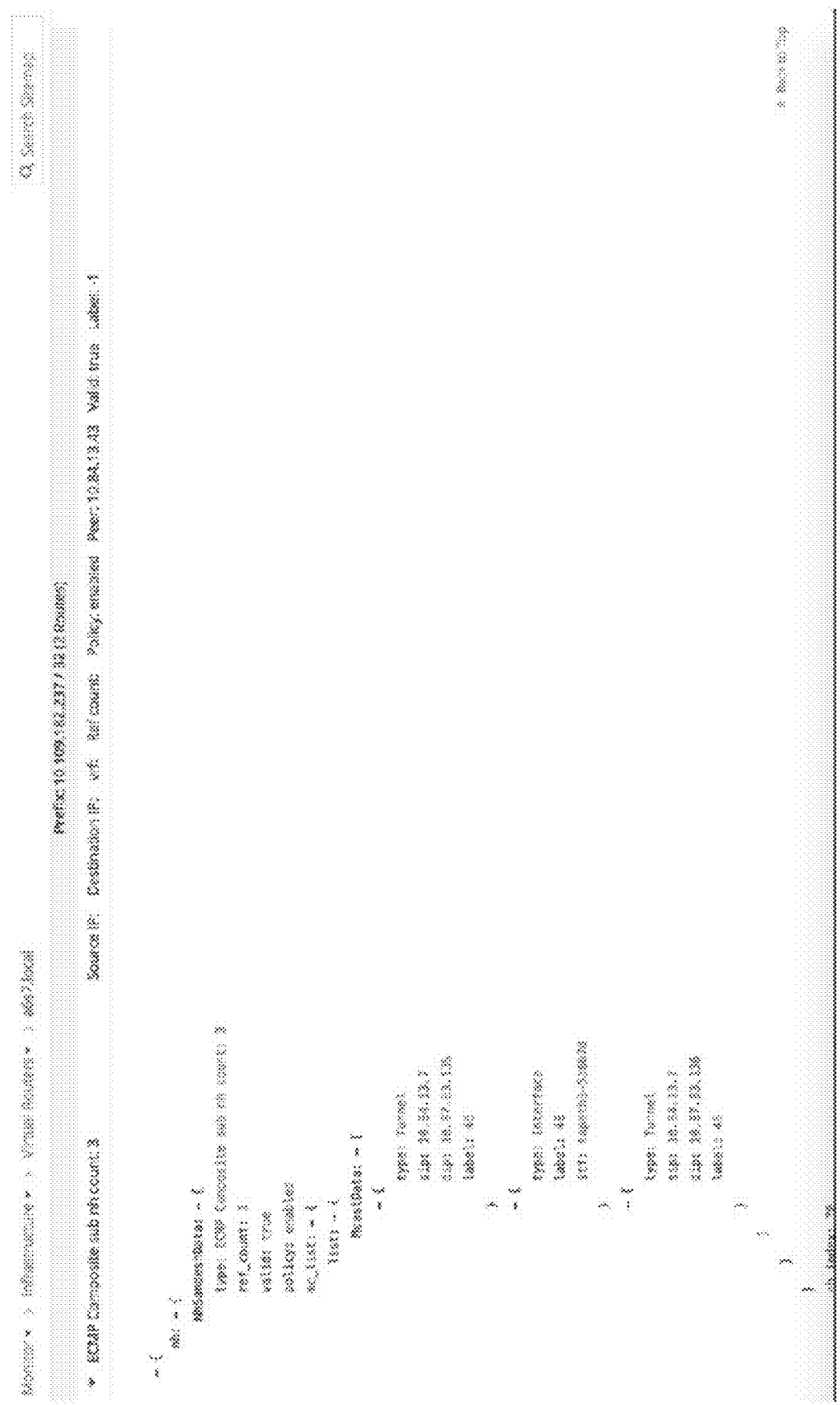
FIG. 11 is a screenshot illustrating an example of a service IP route for a compute node, according to aspects of this disclosure.

FIG. 11 is a screenshot illustrating an example of a service IP route for a compute node, according to aspects of this disclosure. The compute node of FIG. 11 represents "compute 1" in this example use case scenario.

Figure 12:
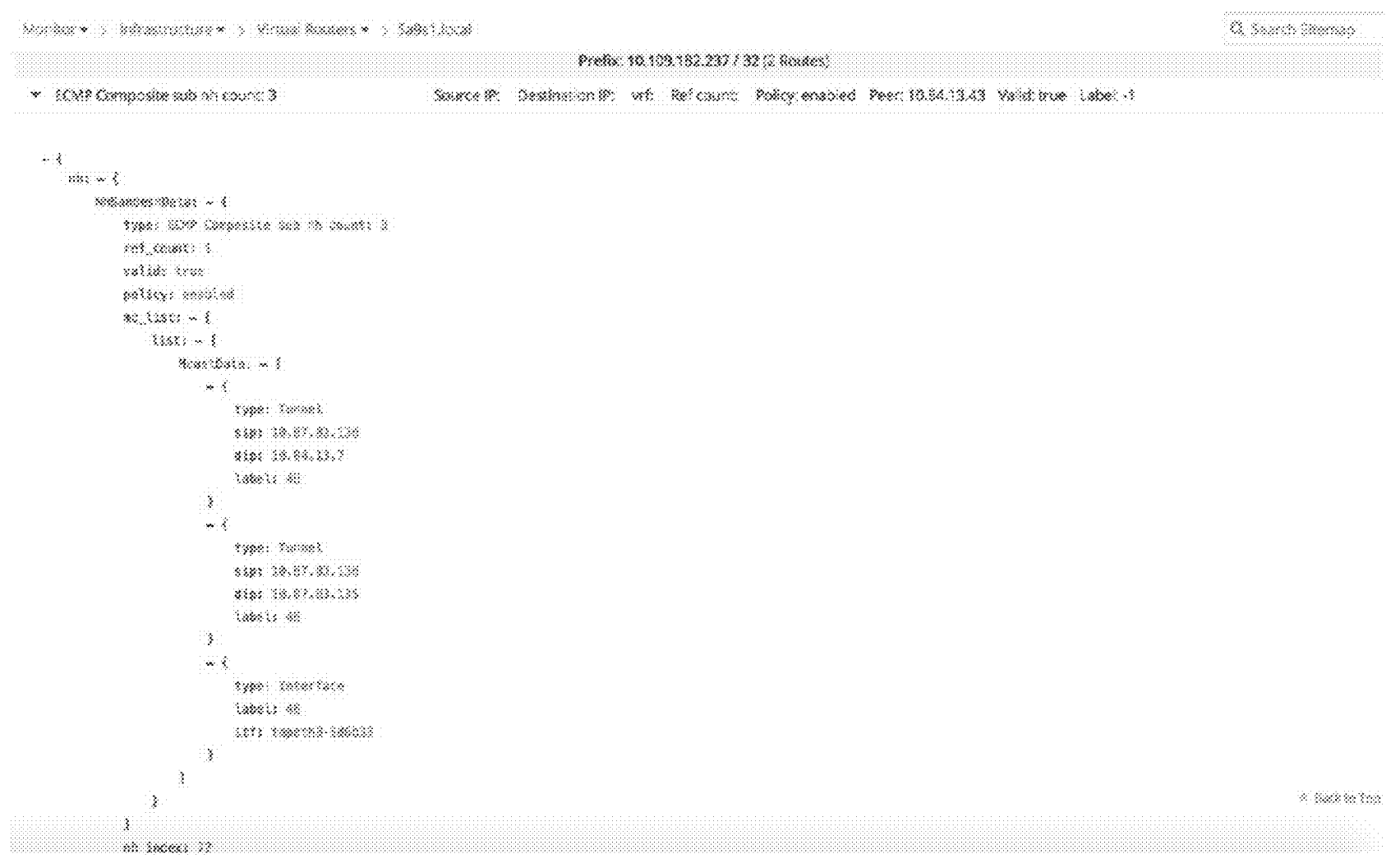

FIG. 12 is a screenshot illustrating an example of a service IP route for another compute node, according to aspects of this disclosure. The compute node of FIG. 12 represents "compute 2" in this example use case scenario.

Figure 13:
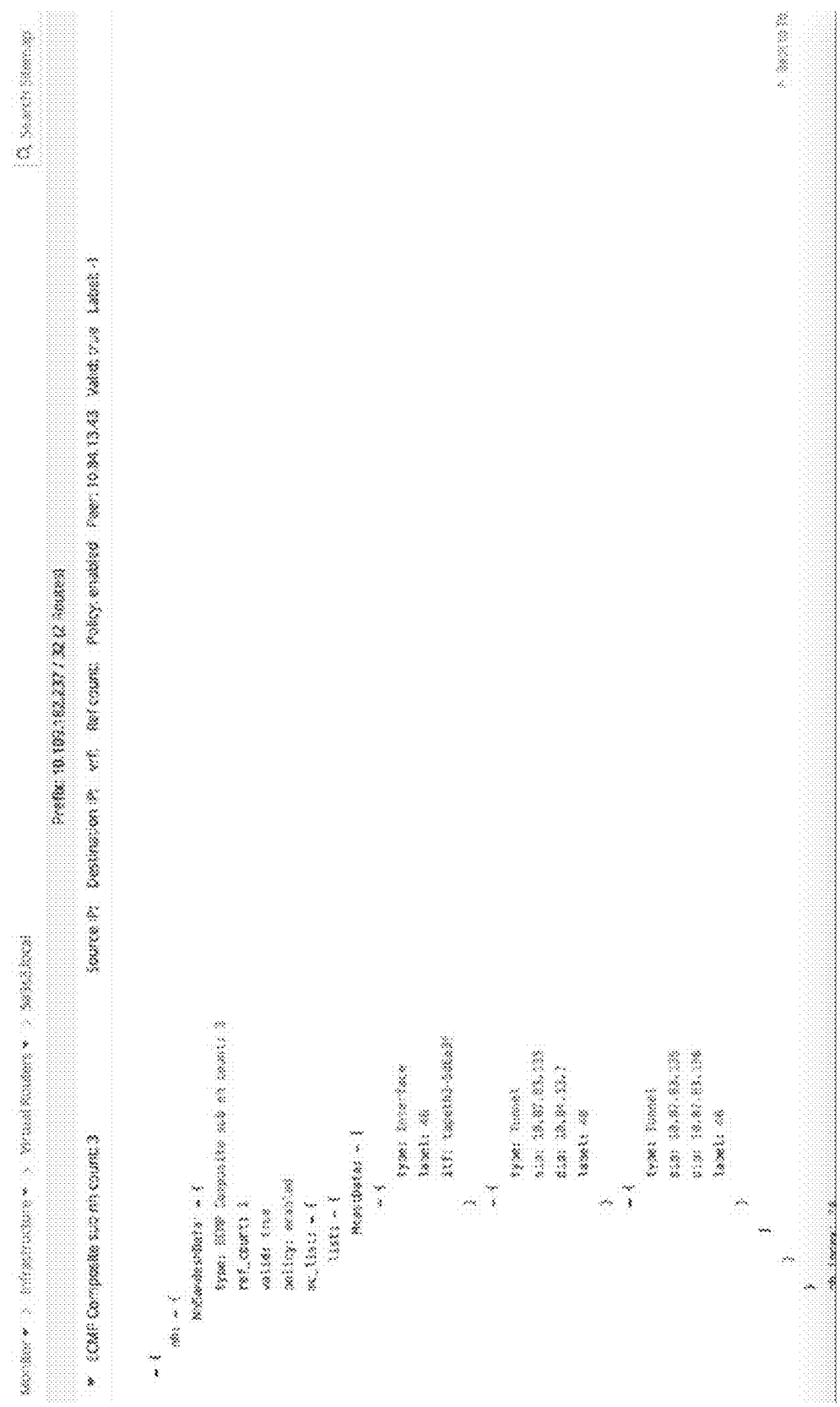
FIG. 13 is a screenshot illustrating an example of a service IP route for another compute node, according to aspects of this disclosure.

FIG. 13 is a screenshot illustrating an example of a service IP route for another compute node, according to aspects of this disclosure. The compute node of FIG. 13 represents "compute 3" in this example use case scenario.

As described in further detail above, to provide reliable services, some orchestration systems, such as Kubernetes, have a service building block which is a loadbalancer that load balances service traffic among one or more pods as backends (also called endpoints).

Even though a pod can have multiple IPs/virtual network interfaces, a pod's primary IP/virtual network interface is used in the endpoint for the Kubernetes service. To facilitate a pod to use other than the primary IP/virtual network interface to expose to a Kubernetes service, techniques are described for specifying the virtual network that can be used to identify and configure the preferred virtual network interfaces. A network controller, such as Contrail, provides a way to configure endpoint network and associate the respective IP/virtual network interface of a pod as a backend to a Kubernetes service.

As described above, a network controller manager (e.g., Contrail kube-manager) listens for Kubernetes events and create/update/delete contrail object in contrail system. The Kubernetes service is mapped to a contrail loadbalancer object. Whenever Kubernetes service is created/updated/deleted, contrail loadbalancer, loadbalancer-listener and loadbalabcer-pool object would be created/updated/deleted. Whenever Kubernetes endpoint is created/updated/deleted, loadbalancer-member would be created/updated/deleted. By annotating endpoint network in kubernetes service, the network controller manager can identify the endpoint network/IP/virtual network interface of a pod and configure as a backend to the loadbalancer in Contrail. Using this any IP/virtual network interface of a pod can be exposed as a backend to Kubernetes service.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
    one or more computing devices interconnected by a physical network, wherein each of the computing devices comprises processing circuitry coupled to a memory device;
    an orchestrator for a virtualized computing infrastructure, wherein the orchestrator is configured for execution by the computing devices, wherein the orchestrator is configured to:
        receive a service definition for a service implemented by load balancing service traffic for the service among a plurality of backend virtual execution elements, wherein the service definition specifies a first virtual network to use as a backend virtual network for the service; and
        instantiate, in a selected one of the computing devices, a backend virtual execution element for the service; and
    a network controller for the virtualized computing infrastructure, wherein the network controller is configured for execution by the computing devices, wherein the network controller is configured to:
        send, to the selected computing device, interface configuration data to configure, for the backend virtual execution element, a first virtual network interface for the first virtual network and a second virtual network interface for a second virtual network; and
        based on the service definition specifying the first virtual network to use as the backend virtual network for the service, configure a load balancer to load balance the service traffic in part to the first virtual network interface.

2. The system of claim 1, wherein the orchestrator is configured to direct the network controller to create the load balancer for the service.

3. The system of claim 1, wherein the network controller is configured to:
    allocate a service Internet Protocol (IP) address for the service; and
    configure the service with the service IP address.

4. The system of claim 1,
    wherein the orchestrator is configured to annotate configuration data for the backend virtual execution element to specify the first virtual network as a backend virtual network, and
    wherein the network controller is configured to, based on the configuration data for the backend virtual execution element, send the interface configuration data to configure, for the backend virtual execution element, the first virtual network interface for the first virtual network.

5. The system of claim 1, wherein the network controller is configured to:
    receive a first virtual network address for the first virtual network interface for the first virtual network; and
    configure the load balancer to load balance the service traffic in part to the first virtual network address.

6. The system of claim 1, wherein the network controller is configured to:
    receive a first virtual network address for the first virtual network interface for the first virtual network in association with a service Internet Protocol (IP) address for the service; and
    configure the load balancer to load balance the service traffic, sent to the service IP address, in part to the first virtual network address.

7. The system of claim 1,
    wherein the orchestrator is configured to create, in the network controller, a load balancer member object, of the load balancer, for the backend virtual execution element and to annotate the load balancer member object with an annotation to specify the first virtual network to use as a backend virtual network for the service.

8. The system of claim 7,
    wherein the network controller is configured to, based on the annotation to specify the first virtual network to use as a backend virtual network for the service, configure the load balancer to load balance the service traffic in part to the first virtual network interface.

9. The system of claim 1,
    wherein the second virtual network interface is the primary interface of the virtual execution element.

10. The system of claim 1, wherein the virtual execution element comprises a Kubernetes pod.

11. The system of claim 10, wherein the load balancer comprises a Kubernetes service that provides access to the Kubernetes pod via a service Internet Protocol (IP) address assigned to the Kubernetes service.

12. An orchestrator for a virtualized computing infrastructure, the orchestrator comprising:
one or more computing devices, wherein each of the computing devices comprises processing circuitry coupled to a memory device,
wherein the orchestrator is configured for execution by the computing devices, wherein the orchestrator is configured to:
receive a service definition for a service implemented by load balancing service traffic for the service among a plurality of backend virtual execution elements, wherein the service definition specifies a first virtual network to use as a backend virtual network for the service;
instantiate, in a selected one of the computing devices, a backend virtual execution element for the service;
based on the service definition specifying the first virtual network to use as the backend virtual network for the service, configure a network controller for the virtualized computing infrastructure to configure a load balancer to load balance service traffic to a first virtual network interface, of the backend virtual element, for the first virtual network.

13. A method comprising:
receiving, by an orchestrator for a virtualized computing infrastructure comprising one or more computing devices, a service definition for a service implemented by load balancing service traffic for the service among a plurality of backend virtual execution elements, wherein the service definition specifies a first virtual network to use as a backend virtual network for the service;
instantiating, by the orchestrator in a selected one of the computing devices, a backend virtual execution element for the service;
sending, to the selected computing device, interface configuration data to configure, for the backend virtual execution element, a first virtual network interface for the first virtual network and a second virtual network interface for a second virtual network; and
based on the service definition specifying the first virtual network to use as the backend virtual network for the service, configuring a load balancer to load balance the service traffic in part to the first virtual network interface.

14. The method of claim 13, further comprising creating the load balancer for the service.

15. The method of claim 13, further comprising:
allocating a service Internet Protocol (IP) address for the service; and
configuring the service with the service IP address.

16. The method of claim 13, further comprising:
annotating, by the orchestrator, configuration data for the backend virtual execution element to specify the first virtual network as a backend virtual network, and
sending, based on the configuration data for the backend virtual execution element, the interface configuration data to configure, for the backend virtual execution element, the first virtual network interface for the first virtual network.

17. The method of claim 13, further comprising:
receiving a first virtual network address for the first virtual network interface for the first virtual network; and
configuring the load balancer to load balance the service traffic in part to the first virtual network address.

18. The method of claim 13, further comprising:
receiving a first virtual network address for the first virtual network interface for the first virtual network in association with a floating Internet Protocol (IP) address for the service; and
configuring the load balancer to load balance the service traffic, sent to the service IP address, in part to the first virtual network address.

19. The method of claim 13, further comprising creating, by the orchestrator, a load balancer member object, of the load balancer, for the backend virtual execution element and to annotate the load balancer member object with an annotation to specify the first virtual network to use as a backend virtual network for the service.

20. The method of claim 13, further comprising configuring, based on the annotation to specify the first virtual network to use as a backend virtual network for the service, the load balancer to load balance the service traffic in part to the first virtual network interface.

* * * * *